I. W. COLBURN.
GLASS DRAWING AND CUTTING MECHANISM.
APPLICATION FILED FEB. 4, 1914.
1,341,262.
Patented May 25, 1920.
10 SHEETS—SHEET 4.
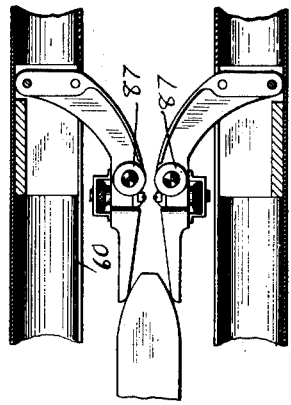
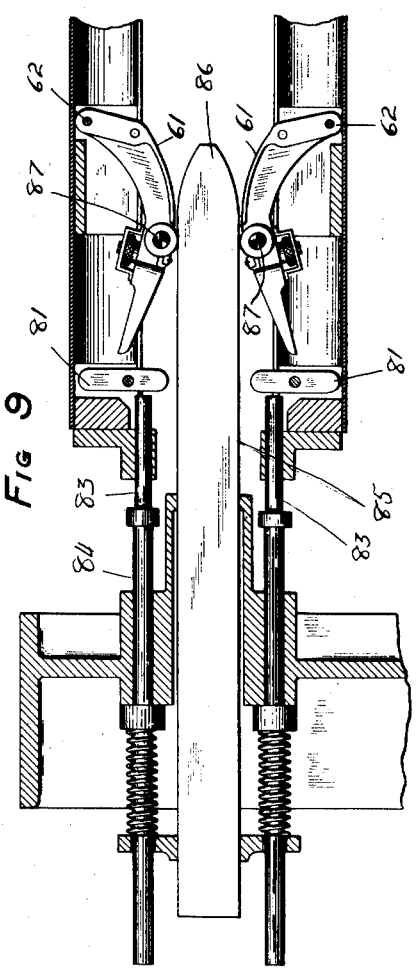
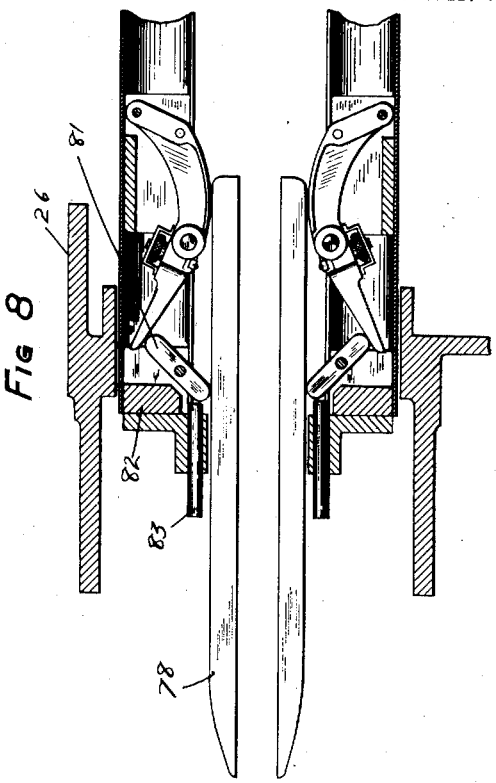
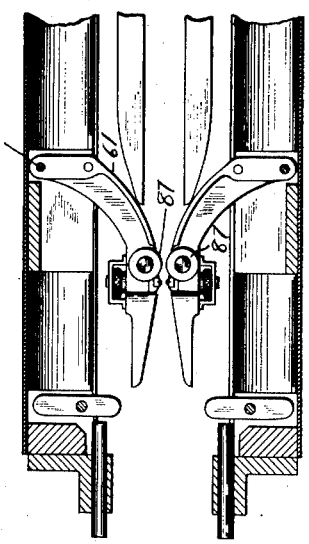
Witnesses
W. K. Ford
Phyllis Coburn
Inventor
Irving W. Colburn
By Whittemore Hulbert & Whittemore
Attys

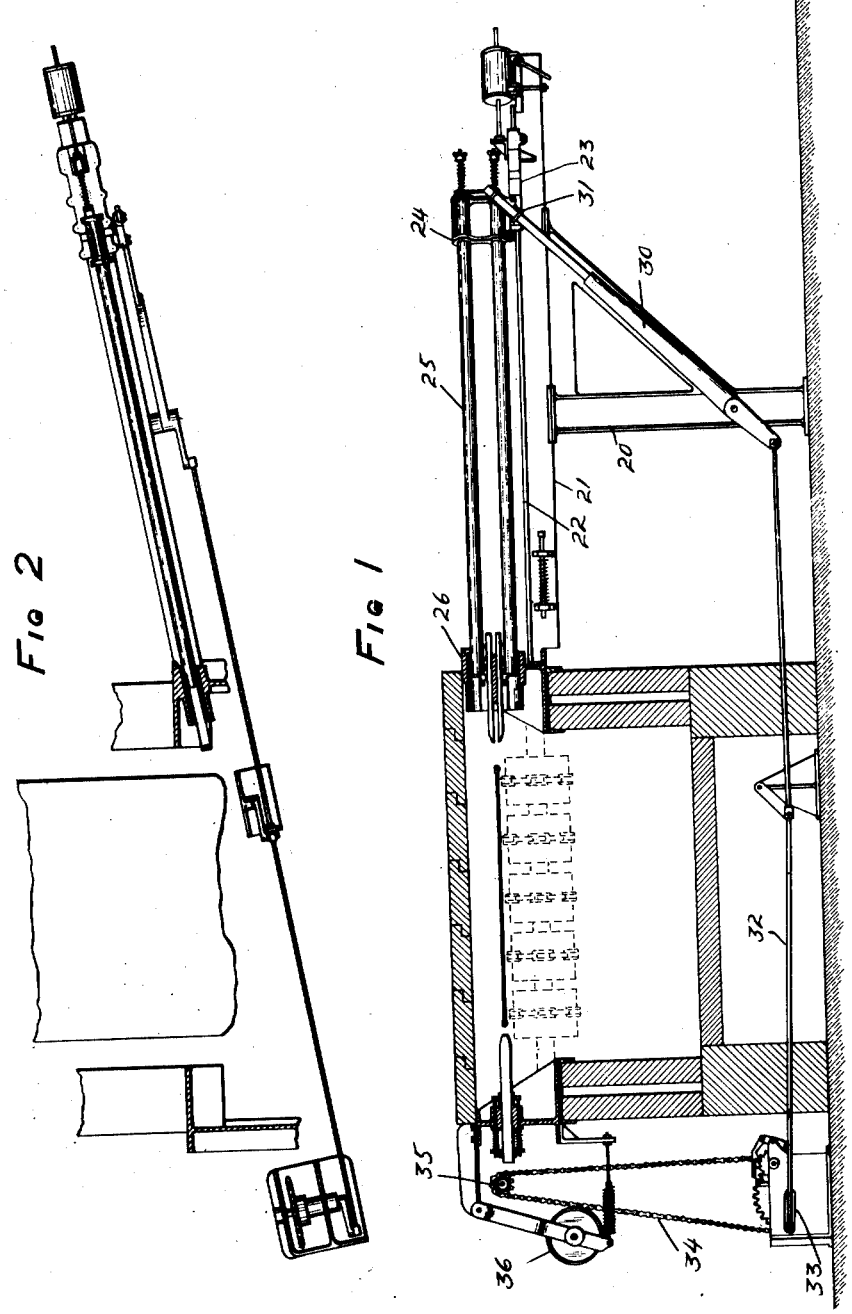

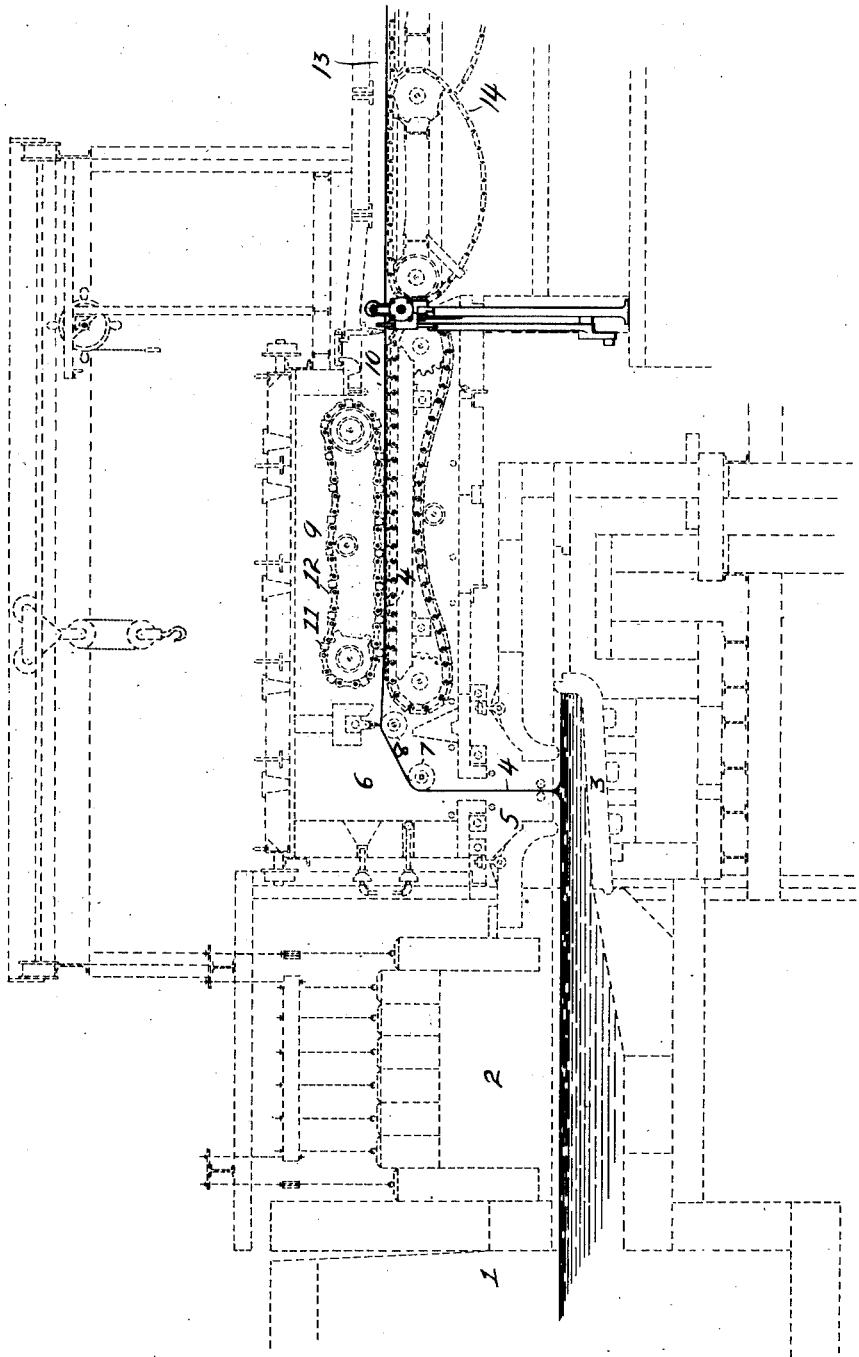

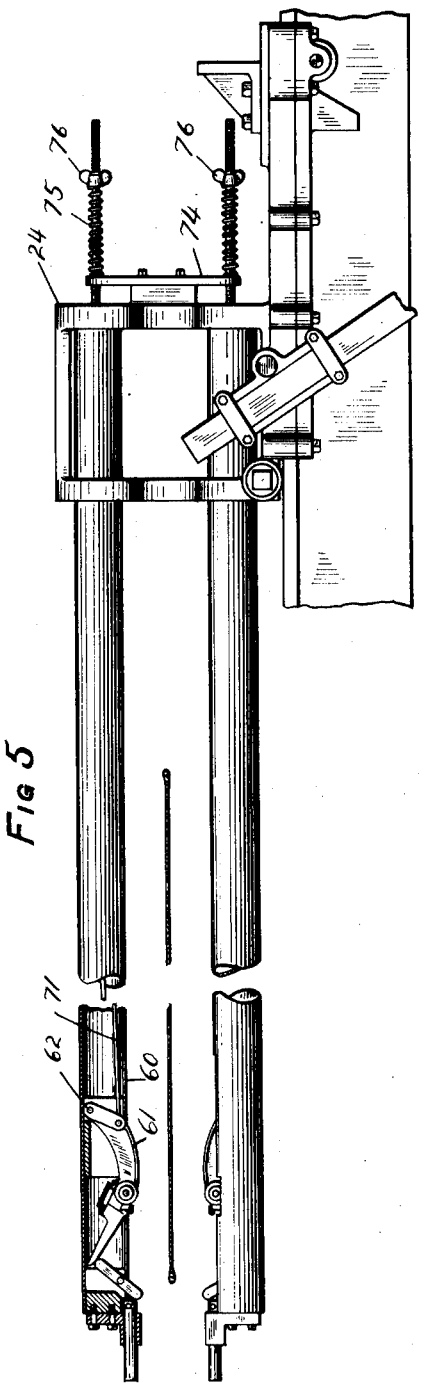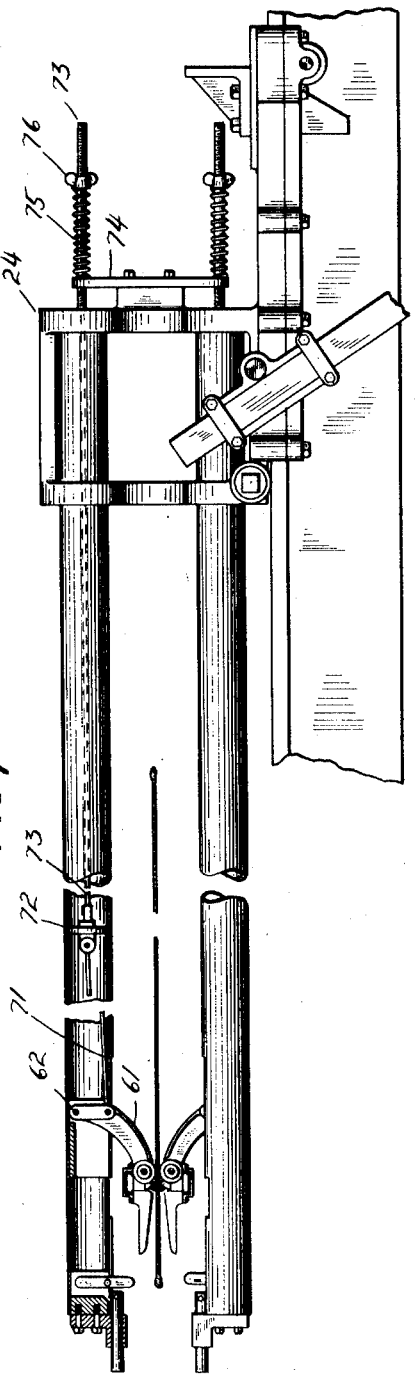

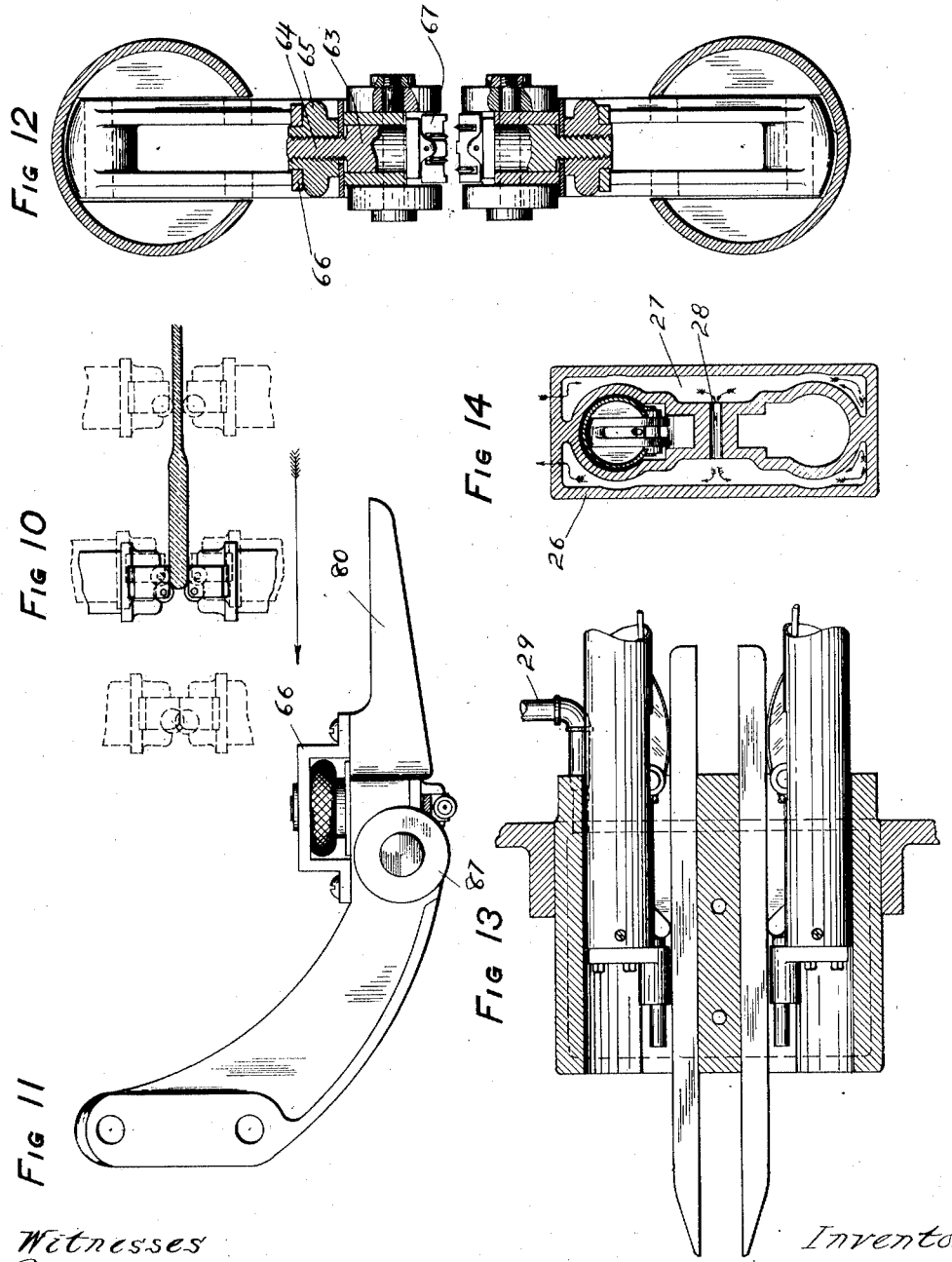

I. W. COLBURN.
GLASS DRAWING AND CUTTING MECHANISM.
APPLICATION FILED FEB. 4, 1914.

1,341,262.  Patented May 25, 1920.
10 SHEETS—SHEET 6.

Witnesses
W. K. Ford
Phyllis Coburn

Inventor
Irving W. Colburn
By Whittemore Hulbert & Whittemore
Attys

I. W. COLBURN.
GLASS DRAWING AND CUTTING MECHANISM.
APPLICATION FILED FEB. 4, 1914.
1,341,262. Patented May 25, 1920.
10 SHEETS—SHEET 7.
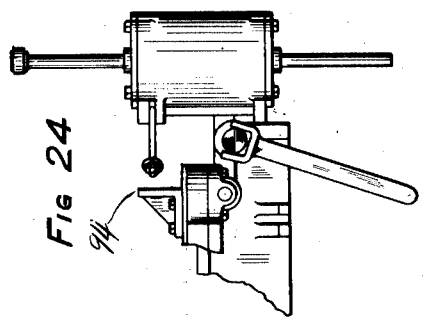
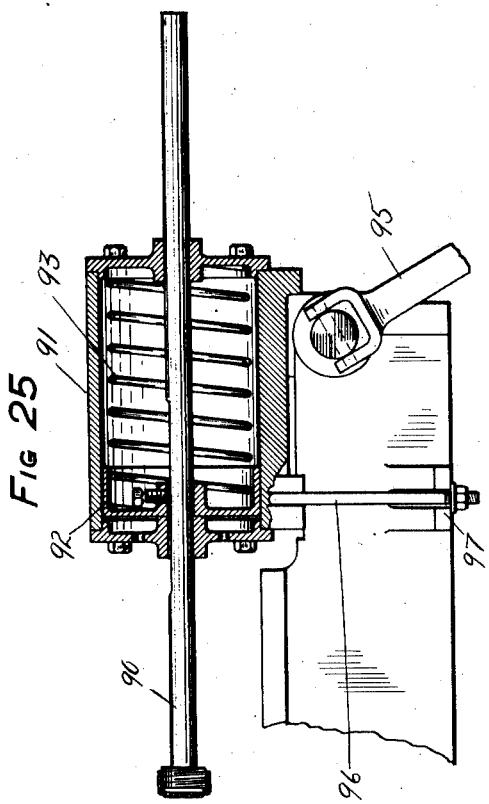
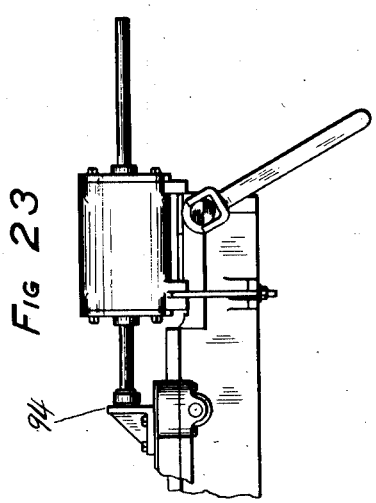
Witnesses
Inventor
Irving W. Colburn I. W. COLBURN.
GLASS DRAWING AND CUTTING MECHANISM.
APPLICATION FILED FEB. 4, 1914.
1,341,262.  Patented May 25, 1920.
10 SHEETS—SHEET 9.
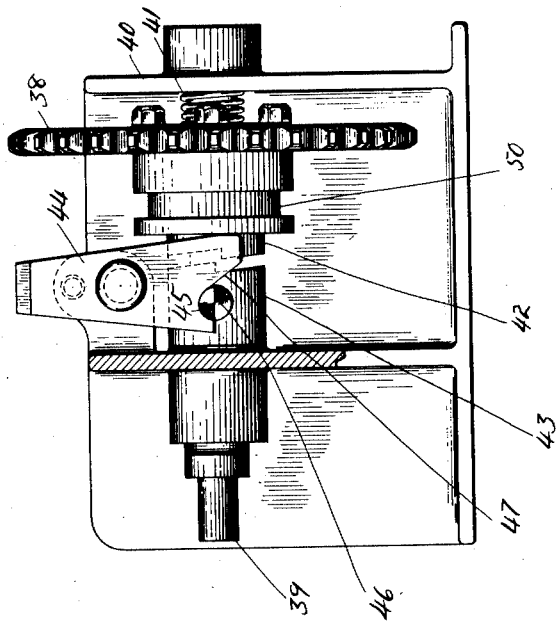
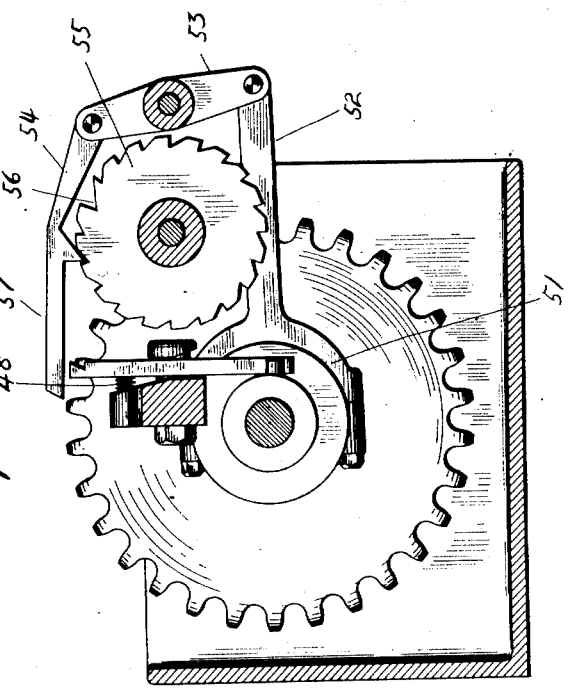

I. W. COLBURN.
GLASS DRAWING AND CUTTING MECHANISM.
APPLICATION FILED FEB. 4, 1914.
1,341,262.
Patented May 25, 1920.
10 SHEETS—SHEET 10.
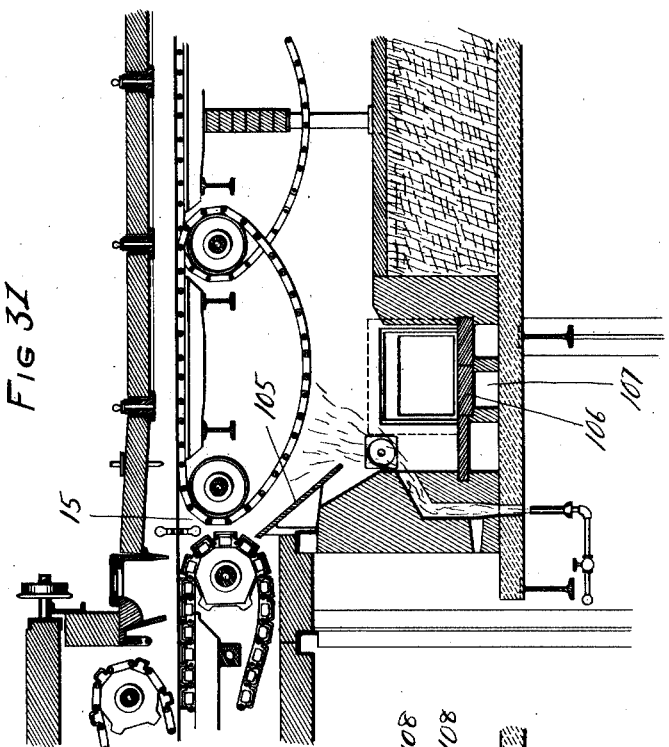
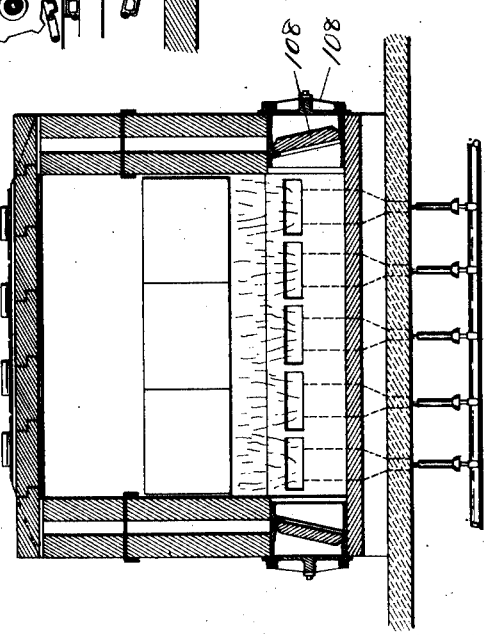
Witnesses
W. K. Ford
Phyllis Coburn
Inventor
Irving W. Colburn
By Whittemore, Hulbert & Whittemore
Attys

UNITED STATES PATENT OFFICE.

IRVING W. COLBURN, OF TOLEDO, OHIO, ASSIGNOR, BY MESNE ASSIGNMENTS, TO THE LIBBEY-OWENS SHEET GLASS COMPANY.

GLASS DRAWING AND CUTTING MECHANISM.

1,341,262.  Specification of Letters Patent.  Patented May 25, 1920.

Application filed February 4, 1914. Serial No. 816,589.

*To all whom it may concern:*

Be it known that I, IRVING W. COLBURN, a citizen of the United States of America, residing at Toledo, in the county of Lucas and State of Ohio, have invented certain new and useful Improvements in Glass Drawing and Cutting Mechanism, of which the following is a specification, reference being had therein to the accompanying drawings.

The invention consists in the construction of an apparatus intended to cut into sections a continuous sheet of glass as it is drawn, as, for instance, by such a drawing apparatus as shown in my Patent 973,002, dated October 18, 1910, and particularly in the construction, arrangement and combination of parts as hereinafter shown and particularly pointed out in the claims.

In drawing glass in sheet form, for instance with such an apparatus as described in my above-mentioned patent, in passing from a molten to annealed or cooled condition there are certain ranges in temperature in which the glass can be cut without fear or danger of breaking the sheet. In drawing glass in continuous form with the apparatus mentioned, it is first drawn vertically and then passed over bending rolls and carried along horizontally on a traveling table, or rotary bed, gripped by grip-bars, and thence passed into the leer. After it passes over the bending rolls a short distance on the drawing-table, it becomes set. After the glass has set permanently and has lost the property of being altered under tension, there is a certain range or limit of temperature, as the glass cools, when the internal strains or stresses in the glass—caused by its contraction in cooling—do not seem to break or crack the sheet; and it is during this period and at this time or place in the travel of the sheet that I apply my cutting apparatus. After it cools beyond this critical temperature period, without any apparent change in the glass it becomes extremely brittle, and the strains, due to contraction, after this period render it extremely liable to breakage.

When the glass reaches this breaking point in its cooling operation it may be said to have reached the critical or dangerous temperature period, and in this specification I will refer to it as the "critical period." The critical period varies somewhat with the composition of the glass itself, but it is usually somewhere between 750° and 850° F., and approximately about 800°. If the glass is cut into sheets and passed into the leer before it reaches the critical period, the annealing and contraction of the sheet takes place with little danger of breakage.

In cutting a continuous sheet of glass while passing through the apparatus, if a single cut is made it is difficult to break the glass along that line of the single cut, without the likelihood of lateral cracks extending into the main body of the sheet. For this reason I preferably provide a series of scoring or cutting devices, in parallelism, so that not only is this danger largely avoided but a section of the sheet is cut out so that the danger of the adjacent sheets impinging one against the other in their passage through the leer, with possible breakage arising therefrom, is also avoided.

In cutting a continuous sheet it is also desirable to cut the same with as little angularity as possible at the end of the sheet, so as to save waste, and I provide means for making a drawing cut at such an angle as will approximately give a right-angled cut across the continuous moving sheet.

The invention also provides means for obtaining a drawing cut on the glass, for providing the cut only in one direction, and holding the cutters free from the glass in the opposite direction, and for striking a blow upon the scored glass so as to crack the sheet along the cut or scored lines and also to knock out a small strip between the two cut or scored lines.

In the drawings:

Figure 1 is a vertical central section through the cutting or scoring apparatus, the cutting or scoring arms being shown in elevation;

Fig. 2 is a plan view thereof, partly in section, the top of the cutting chamber or leer being removed;

Fig. 3 is a vertical longitudinal section through a glass drawing apparatus, the same being shown in dotted lines and the cutting apparatus being shown in end elevation in full lines;

Figs. 4 and 5 are side elevations of the cutter carriage and tubes, partly in section, showing different positions of the cutter arms;

Figs. 6, 7, 8 and 9 are sections through the inner end of the cutter tubes, showing the cutter arms in various positions and showing the cam brackets for controlling the same at the ends of their movement;

Fig. 10 shows the edge of the sheet of glass in section and in full and dotted lines different positions of the cutters at different points of their travel;

Fig. 11 is a large side elevation of one of the cutter arms;

Fig. 12 is a vertical section through the two cutter tubes and through the cutter arms on the line of the cutters, showing part of the cutters in elevation.

Fig. 13 is a section through the water-cooled guide on which the ends of the cutter tubes rest, between operations;

Fig. 14 is a vertical central section therethrough, showing one of the cutter arms in position and the other omitted;

Fig. 23 is a side elevation of the spring buffer for the cutter carriage;

Fig. 24 is a similar elevation showing the spring buffer tilted to permit of the withdrawal of the cutter tubes to the outside of the casing;

Fig. 25 is a vertical central section through the cutter carriage and buffer shown in Figs. 23 and 24;

Fig. 29 and Fig. 30 are a side and front elevation, respectively, of the intermittent actuating device for the cutter carriage;

Fig. 31 is a vertical central longitudinal section through the receiving end of the leer, showing the location of the cutter and means for receiving and cooling the strip of glass cut from the glass sheet; and Fig. 32 is a cross-section on line $y$—$y$ of Fig. 31, the leer carriage being omitted.

Figure 19:
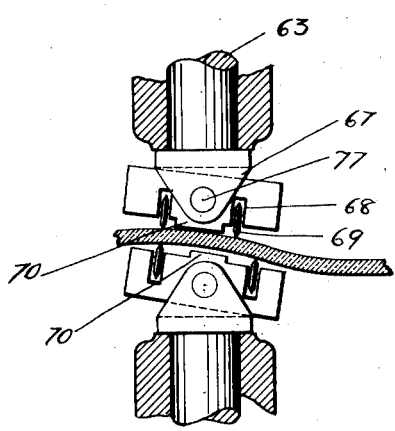
Figs. 15, 16, 17, 18, 19, 20, 21 and 22 are sections through the sheet of glass, showing the different forms of cutters applied thereto.

At 1 is shown the end of the refining chamber of the continuous melting tank; 2 is the cooling chamber and 3 the drawing-pot of a glass-drawing apparatus from which a sheet of glass, 4 is adapted to be drawn between the covering lip-tiles over the drawing-pot or pool.

As the sheet is drawn upwardly from the drawing-pot it passes first into a cooling atmosphere space, 5, above the drawing-pot, and thence into a heated chamber, 6, passing over rolls, 7 and 8, where it is bent from the vertical to the horizontal, and thence into the drawing-chamber, 9, upon the drawing-table, 10; being drawn by means of contacting bars, 11, on an endless chain, 12, arranged to pass above the drawing-table; all of which may be substantially as set forth and described in my previous patent referred to, or modified, as shown in Fig. 3.

The sheet from the drawing-table passes into a leer, 13, in which is a suitable leer carrier, 14, the construction of which is immaterial for this particular application but which may consist (as shown in dotted lines in Fig. 3 and full lines in Fig. 31) of endless carriers, arranged to present a flat top, by means of which the sheet is carried through the leer to the discharge end thereof. Between the drawing table and the leer-carrier is a gap or space, 15, (Fig. 31) and at this gap or space I preferably locate my cut-off mechanism. It is at this point that the glass has set sufficiently to be cut or scored and yet has not been cooled sufficiently to have reached what I have previously referred to as the critical period, that is, the period at which the internal strains, due to the cooling of the glass, cause it to break or crack.

While I have shown the cutting mechanism applied at this particular point in the apparatus, it is obvious that by suitable heating or cooling means this particular temperature at which it is desirable to cut the glass may be reached at other points; but for the reasons of convenience and economy it is desirable to have it as near as possible to the drawing-table, as thus the heat required and the length of the apparatus which is necessary are reduced.

Outside the leer, opposite this gap, I arrange a suitable supporting frame, 20, having a top beam, 21, and side flanges, 22, upon which the cutter carriage, 23, is supported and guided. This carriage is provided at its inner end with a head, 24, to which are secured separated cutter tubes, 25, arranged one above the other. These cutter tubes project into the housing, 26, provided with two tubular guides therethrough, the housing being secured in the side wall of the leer at the top and opposite the plane of the glass at the gap 15 between the drawing-table and the leer carriage. This housing is preferably of the construction shown in Fig. 14, having water passages, 27, on opposite sides of the guides, connected by ports, 28, with suitable inlet and outlet water pipe connections, 29, so that a circulation of water may be maintained therethrough to keep the cutters cool between cutting operations.

The cutter carriage, with its connected head and tubes, may be intermittently reciprocated by any desired mechanism. I have shown a lever, 30, pivoted on the frame 20 and slidingly engaging at its upper end in a pivoted guide, 31, arranged on the side of the cutter carriage and at its lower end connected to a connecting-rod, 32, which is in turn connected to a crank, 33, adapted to be intermittently actuated by a drive mechanism operated by a sprocket-chain, 34, driven from a sprocket-wheel, 35, which is continuously driven from any suitable source. This sprocket-chain is shown provided with a spring-tension idler, 36.

The construction of this intermittently actuated mechanism may be of any desired type; that which I have illustrated is shown in Figs. 29 and 30 and comprises the sprocket-wheel, 38, loosely sleeved upon a shaft, 39, the sprocket-wheel being continuously driven from the sprocket-chain 34. Between the hub and the bracket 40 in which the shaft 39 is supported, is a spring, 41, acting to move the sprocket-wheel to the left of Fig. 30. On the inner end of the hub of the sprocket-wheel is a clutch member, 42, and a complementary clutch-member, 43, is keyed to the shaft 39. A tripper, 44, is pivoted on the bracket 40 and has a recess, 45, with which a pin, 46, on the clutch-member 43 is adapted to engage, this recess having an inclined or cam face, 47. The trigger 44 is held in engagement with the pin 46 by a spring, 48 (Fig. 29).

50 is an eccentric on the hub of the sprocket-wheel 38, with which a suitable eccentric strap, 51, engages; 52 being the eccentric rod connected thereto and connected at its free end with a lever, 53, which at its upper end carries a pawl, 54, adapted to engage a ratchet-wheel, 55, constructed so that each revolution of the eccentric 50 will move the ratchet-wheel one tooth. A deeper detent, 56, is provided at one point in the ratchet-wheel, so that the pawl, when it reaches the detent 56 will fall to a lower point and so that the extension, 57, thereon, will strike the upper end of the trigger 44 and disengage it from the pin 46. When this happens the spring 41 will move the clutch member 42 into engagement with the clutch member 43, couple the sprocket-wheel with the shaft 39 to which the crank 33 is connected and turn that crank a single revolution and move the cutter carriage forward and back; the cutters therein being moved across the sheet of glass at the gap 15. As the crank approaches the completion of its revolution, the pin 45 will strike the incline 47 on the trigger 44 and in riding up that incline will force the clutch member 43 laterally out of engagement with the clutch member on the hub of the sprocket-wheel, and thus stop the cutter from operating until the ratchet wheel 55 has again completed another revolution.

At the outer end of each of the cutter tubes I attach suitable cutting devices for scoring or cutting through the glaze on the glass-sheet, one cutter being arranged on the under surface of the glass and one on the upper surface. By having cutters above and below the glass sheet, when the cutter is located at the gap 15 previously described, these cutters pressing with substantially equal force on the opposite sides of the sheet, I greatly reduce the danger of breakage. By locating the cutters at the gap, and arranged as in this case, I cut out a strip of glass from a continuous sheet and when that strip is knocked out by a hammer blow it has space at the gap for falling, so that it will not be carried through the leer and may be collected and removed with less labor and inconvenience. The two cutters are alike except in minor details, and description of one will suffice for both. These cutters are shown in detail in Figs. 4 to 22, inclusive.

Near the end of the cutter-tube on the inner face I provide a slot, 60, and within the tube, preferably at the side opposite the slot, I pivot the cutter arm, 61, on a pivot pin, 62. The cutter arm is provided at or near its middle with a circular aperture in which is fitted the pin 63. This pin is provided at its upper end with a screw-threaded stem, 64, which engages through an adjusting nut, 65, this nut being located between the upper face of the cutter arm and a strap, 66; these parts being so constructed that by turning the nut the pin may be raised and lowered and likewise the cutter-head, 67, raised and lowered. The cutter-head is pivoted on the pin, 77, between separated lugs, 67, on the lower end of the pin 63; the construction which I prefer for the cutter-head being shown in Fig. 19.

The preferred construction comprises two cutters on each cutter-head, and I have shown the cutter-head provided with a recess, 68, in which are journaled hardened steel disks, 69, with scoring edges, and between these disks is an abutment, 70. As shown in Fig. 19, the disks on the upper cutter-head and the lower cutter-head are spaced differently, so that when the two abutments 70, come together the cutter disks will not contact or strike the opposing cutter-head, the abutments being sufficiently high to give celarance for the cutters when the two abutments are in contact.

The cutter wheels are located at one side of the abutments, as clearly shown in Fig. 10, and the outward projection of the abutments beyond the cutter-wheels forms a hammer which strikes the glass to crack it along the cut lines and knocks out the strip between the cutter-wheels, as will be hereinafter described.

The cutter-arms are provided with spring-tension devices for the purpose of holding the disks against the glass with sufficient force to score the same, and these spring tension devices may be of any desired construction. I have illustrated the same as comprising a connecting-rod, 71 (Figs. 4 and 5), which connects to a piston-guide, 72, in the tube, and this piston-guide has attached to its other side a rod, 73, which extends through the end of the tube and through a stationary guide, 74, on the head 24; a spiral spring, 75, encircling the rod 73 and bearing at one end against the guides 74 and at the opposite end against a winged nut, 76,—so that the tension of the spring may be adjusted at will.

The cutter-arm is provided forward of the cutter with the finger, 80, and in advance of the end of this finger, a latch, 81, is pivoted in the cutter tube. In the end of the cutter tube is a block, 82, in the lower end of which is slidingly supported the plunger, 83. This plunger is arranged in line with the spring-backed stop, 84, on the far side of the leer; so that near the end of the inward movement of the cutter tubes the plunger 83 will strike the spring stops 84 and push in the plunger 83 to strike the latch 82 and actuate the same from the position shown in Fig. 8 to the position shown in Fig. 9.

Secured in the far side of the leer casing is the bar cam, 85, projecting inwardly into the leer between the two cutter arms and provided with a tapering inner end, 86. Upon the opposite side of the leer casing and between the two guides for the cutter tubes are secured the cam bars, 78, with tapering outer faces at their inner ends, as clearly shown in Fig. 8. Upon the outer faces of the two cutter arms are suitable journals upon which are journaled the anti-friction rollers.

As the cutter tubes are drawn toward the water-cooled housing or guide, 26, the inclined inner faces of the cutter arms strike the inclines on the cutter bars 78 and move the cutter arms toward the cutter tubes until the rollers, 87, strike the inclines, when the cutter arms ride upon the rollers. This forces the cutter arms into the tubes in moving from the position shown in Fig. 7 to that shown in Fig. 8. The lower ends of the latches 81 will likewise strike the inclines on the cam bars 78, after the cutter arms are swung up to the position shown in Fig. 8, and these latches will engage beneath the cutter arms and hold them within the cutter tubes, pushing out the plungers 83. When the cutter tubes are moved inward by the rocking of the lever 30 the cutter arms will be maintained in this position free from the glass until they reach the far side of the leer, when the plungers 83, striking the spring stops 84, will be pushed in and will release the cutter arms, when the springs 75 will draw the cutter arms inward and the rollers 87 will rest upon the outer faces of the cam bar 86. When the cutter tube returns, the cutter again re-crosses the glass sheet and the rollers 87 will roll down the incline at the end of the cam-bar 86 and permit the cutter disks upon the opposing cutter arms to rest firmly upon opposite sides of the glass sheet, to cut or score the surface thereof in the return travel, making separated scores upon opposite sides of the sheet.

When the cutters reach the edge of the sheet, as shown in Fig. 10, they will pass off and the two abutments 70 will strike the glass upon opposite sides a blow equal to the force exerted by the springs 75 and crack the glass along the scored lines, causing the separated piece to drop out and fall through the gap between the drawing-table and the leer.

After this blow has thus been struck, the glass severed and the cut strip removed, the continued movement of the cutter tubes will cause the cutter arms to strike the cam bars 78 and the latches will likewise strike those arms and the parts will again resume the position shown in Fig. 6, ready for another operation.

It is obvious that as the cutters are retracted within the water-cooled casing 26 and held there between cutting operations, they will be prevented from becoming overheated.

To prevent undue shocks to the cutter-carriage I provide, as previously described, the spring-backed stops 84 at one end and at the inner end I provide an air or spring cushion, shown in Figs. 23 to 25, inclusive—comprising a stop-bar, 90, guided in a stationary cylinder, 91, and having attached to it a piston, 92, backed by a spring, 93; and the carriage having a bracket or stop, 94, which strikes the end of the bar 90 just prior to the finish of its movement. In order that, if desired, the cutters may be withdrawn from the water-cooled casing 26, I provide means for removing the stop-bar 90 out of the path of the cutter carriage. This may be accomplished by pivoting the cylinder 91 upon the frame of the machine and providing a lever, 95, for tilting it upon its pivot to the position shown in Fig. 24; and I provide anchor-bolts, 96, at the forward end of the cylinder, and engaging lugs, 97, which hold the cylinder in its operating position, these bolts being adapted to be released when the cylinder is to be turned to inoperative position.

The driving shaft, 98, which drives the sprocket 35, I preferably provide with a fly-wheel, 99, loose upon the shaft and frictionally-engaged therewith, by providing upon one side the stationary collar 100 and upon the other side the sliding collar, 101, backed by a spring, 102; so that in stopping and starting the fly-wheel can have a slight rotational movement between its holding surfaces, and thus take the strain off the operating parts.

I also preferably connect the sprocket-wheel 35, with its shaft, with a ball clutch, 103, so that if the drive-shaft 98 is reversed in motion, no motion will be imparted to the sprocket-wheel; but in the forward motion of the shaft the sprocket-wheel is positively driven.

In order to produce as straight a line of cut as possible across the moving sheet I arrange the cutters at an angle to the sheet, as shown in Fig. 2. In that figure, the angle is exaggerated but it is intended that the angle shall be one which shall make as nearly straight a line as possible across the sheet, due to the travel thereof—and this angle of course depends upon the speed of the sheet and the speed at which the cutters travel.

It will be noticed that the cutters are beyond the pivotal point of the cutter arms, so that the cutters act upon the glass during the cutting operation with what is known as a "drawing" cut as distinguished from a pushing cut. This drawing cut gives a much cleaner and continuous break in the glazed surface of the glass than if the same was produced by a pushing cut.

When the strip of glass is broken out by the hammer blow it falls through the gap 15 between the drawing-table and the leer carrier, upon an inclined plate, 105, thence upon the floor, 106, beneath which are the air-cooled passages 107, and at the ends of which are double doors, 108. This construction keeps the glass cool and prevents the heated strips from melting together, and the doors permit ready access of a tool for drawing it out from time to time without danger of air-currents entering at that point when the door is closed—which might prevent the proper annealing of the glass.

In Figs. 15 to 22 I have shown various forms of cutters, the preferred form being shown in Fig. 19, which also illustrates to an exaggerated degree how the cutter-heads, by pivoting upon their pivot pins 77, may give a continuous cut even if the glass is somewhat bent or wavy. In this figure it will be observed that the upper cutters are staggered in relation to those below, and space is provided beside the cutters in the opposite heads so they will not strike each other or the heads. This form of cutter, it will be observed, will make four separated scores, which is an additional safeguard against cracks extending into the body of the sheet.

Figure 15:
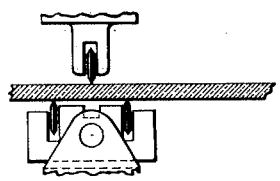
Figure 16:
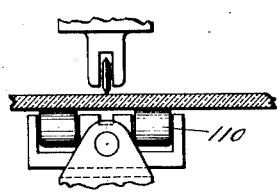
Figure 20:
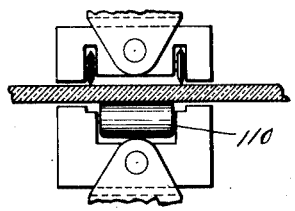
Figure 17:
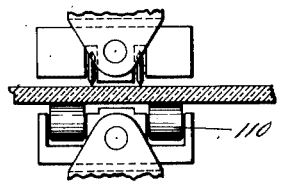
Figure 21:
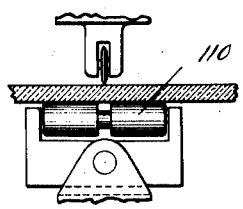
Figure 18:
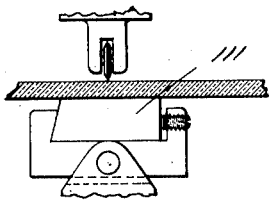
Figure 22:
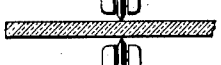
Figure 26:
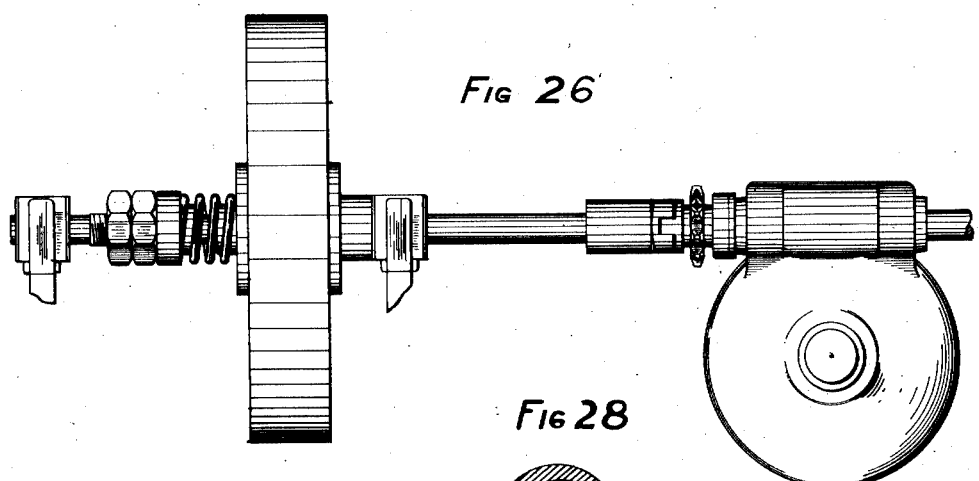
Fig. 26 is a side elevation of the drive mechanism for the intermittent actuating mechanism for the cutter carriage.
Figure 28:
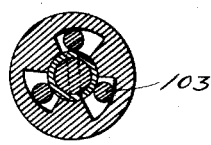
Fig. 28 is a vertical section on line $x$—$x$ of Fig. 27.
Figure 27:
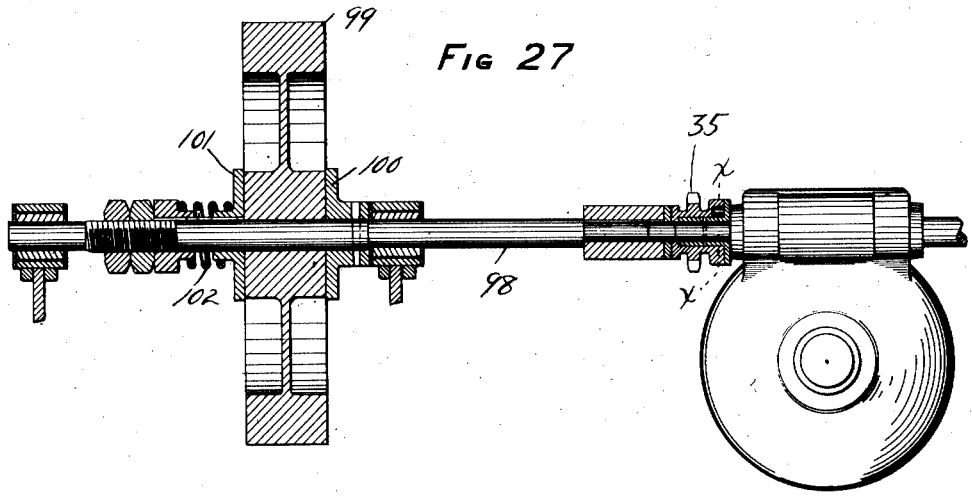
Fig. 27 is a longitudinal section therethrough.

In Fig. 15 I show a single cutter above and two cutters below; and in Fig. 22, single cutters above and below. In Figs. 16, 17, 20 and 21 I show cutters only on one cutter-arm, and on the opposite cutter-arm merely counteracting bearings in the shape of rollers, 110, of appropriate shape for the cutter shown. In Fig. 18 I show this counteracting bearing as simply a block, 111, resting on the underside of the glass.

The operation of the apparatus is apparent from the description given, and it is evident that, proper temperatures being maintained in the drawing apparatus, and the drive shaft 98 being in motion, the lever 30 will be intermittently rocked and the cutter-tubes reciprocated across the glass sheet.

What I claim as my invention is:

1. The combination with mechanism for longitudinally feeding a sheet of glass, of means for moving surface scoring means transversely across the sheet upon opposite sides thereof.

2. The combination with mechanism for longitudinally feeding a sheet of frangible glass, of means for cutting a transverse strip out of the sheet.

3. The combination with mechanism for longitudinally feeding a sheet of glass, of a surface cutting device adapted to move across the sheet, and a counteracting device bearing on the sheet opposite the cutting device and movable therewith.

4. A cutter for a glass sheet comprising opposed surface cutters bearing on opposite sides of the sheet and means for moving the cutters simultaneously across the sheet.

5. The combination with a cutter for a glass sheet comprising a surface cutter and means for moving it across the sheet, of a hammer for striking the cut sheet to fracture the sheet along the cut and mechanism for actuating the hammer.

6. The combination with a cutter for a glass sheet, comprising a pair of laterally separated surface cutters, of means for moving them across the sheet and a mechanically actuated hammer adapted to strike the sheet at or near the cut.

7. The combination with a surface cutter for a glass sheet of means for moving it across the sheet and a hammer adapted to automatically strike the sheet at or near the cut on the completion thereof to fracture the sheet along the line of cut.

8. In a cutting device for a glass sheet, the combination of a spring-pressed arm transversely movable across the sheet, a cutter-head thereon, a surface cutter thereon projecting beyond the surface thereof back from the edge of the cutter-head, whereby when the cutter leaves the edge of the glass the cutter-head will strike the glass and act as a hammer thereon to crack the glass along the cut.

9. The combination with a chamber and means for moving a glass sheet therethrough, of a cutter for the sheet, comprising a bar, a cutter thereon and reciprocating devices for the bar outside the chamber, adapted to move the bar with the cutter across the sheet within the chamber.

10. The combination with a heated chamber and means for moving a glass sheet therethrough, of a cutter for the sheet, a casing at one side of the chamber, in which the cutter is housed between cutting operations, means for intermittently reciprocating the cutter back and forth across the sheet, and cooling means for the cutter, in the housing.

11. The combination of means for moving a cutter across a glass sheet, a cutter-arm hinged thereto, means for pressing the free end of the arm upon the sheet, a cutter thereon, and counteracting means moving across the sheet on the side opposite the cutter.

12. The combination with separated supports for a glass sheet, of a cutter, means for moving it in a fixed single path across the sheet between the supports and a counteracting means simultaneously moving across the sheet on the side opposite the cutter.

13. The combination with separated supports for a glass sheet, of a cutter, means for moving it across the unsupported section of the sheet, a hammer for striking the cut sheet to fracture the sheet along the line of cut and means by which the hammer is operated.

14. The combination with separated supports for a glass sheet, of a surface cutter adapted to make a pair of separated cuts in the glass between the supports and means for vibrating the cut sheet to cause the sheet to break along both cuts.

15. The combination of a cutter-bar, a cutter-arm hinged thereto, a cutter thereon, means for reciprocating the cutter back and forth across a sheet of glass, means for holding the cutter free from the glass in its movement one way, means for releasing it at the end of its travel, and a spring carried by the cutter bar for holding it in yielding contact with the glass in its travel the other way.

16. The combination with a cutter-bar, of a cutter-arm hinged thereto, a cutter thereon, means for reciprocating the cutter back and forth across the sheet of glass, means for holding the cutter free from the glass in its movement one way, automatic means for releasing it at the end of its travel, and a spring carried by the cutter bar for holding it in yielding contact with the glass in its travel the other way.

17. The combination with a cutter-bar, of a cutter-arm hinged thereto, a cutter thereon, means for reciprocating the cutter back and forth across the sheet of glass, means for holding the cutter free from the glass in its movement one way, automatic means for releasing it at the end of its travel, a spring carried by the cutter bar for holding it in yielding contact with the glass in its travel the other way, and means for lifting the cutter to its inoperative position before its return for another operation.

18. The combination of a reciprocating cutter arm, a cutter head pivoted thereto to rock transversely and a cutter carried by the head.

19. The combination of a cutter-arm, a head pivoted thereon to rock transversely, a cutter on the head and a reciprocating cutter-bar carrying the cutter-arm.

20. The combination of means for moving a cutter across a sheet of glass and a cutter pivoted thereto to rock transversely to its line of travel as it moves over the glass.

21. The combination of a cutter bar, means for moving it transversely across a sheet of glass, a transversely rocking cutter thereon and means for yieldingly holding the cutter against the glass during the cutting operation.

22. The combination of means for moving a cutter across a sheet of glass, a transversely rocking cutter-head thereon, a complementary counteracting rotating bearing on the opposite side of the sheet and means for moving it synchronously with the cutter.

23. The combination of means for feeding a sheet of glass, laterally separated cutters for opposite faces of the sheet and means for moving the cutters across the sheet.

24. The combination of means for feeding a sheet of glass, cutters for opposite faces of the sheet, each comprising separated surface cutters, the cutters on the one face being spaced differently from those on the other face, and means for moving the cutters across the sheet.

25. The combination with means for drawing a sheet of plastic glass, bending it and feeding it in a horizontal plane until it is cooled to a frangible state, of automatic means for cutting the moving frangible sheet, a leer, and means for moving the cut sheets through the leer.

26. The combination with means for drawing a sheet of plastic glass, bending it and feeding it in a horizontal plane until it is cooled to a frangible state, of automatic means for cutting the moving frangible sheet, a leer, and means for continuously moving the cut sheets away from the cutting point through the leer.

27. The combination with means for drawing a sheet of plastic glass, bending it and feeding it in a horizontal plane until it is frangible, of automatic means for cutting out and removing a narrow section of the moving frangible sheet.

28. The combination of means for feeding a sheet of glass, a spring-pressed cutter arranged at one side of the sheet, means for moving the cutter yieldingly in contact with the glass and an inclined cam-bar down which the cutter moves in approaching the sheet.

29. In a sheet glass drawing mechanism, the combination of the drawing table, the carrier adjacent to but spaced therefrom, means for cutting a strip of glass out of a drawn sheet at the gap between the drawing table and carrier, and a cooled chamber into which the cut strip may fall.

30. In a glass-cutting apparatus, the combination of a reciprocating cutter-head, a buffer therefor comprising a spring-backed bar, and means for moving the buffer out of the way of the cutter-head to permit its withdrawal beyond its normal travel.

31. The combination with mechanism for scoring a sheet of glass of coöperating means for fracturing the sheet along the scored line.

32. The combination with mechanism for producing a multiple of separated scores on a glass sheet of coöperating means for fracturing the sheet along each scored line.

33. The combination with mechanism for scoring a sheet of glass of a hammer for striking the sheet adjacent the scored line to fracture it along the scored line.

34. The combination with mechanism for scoring a sheet of glass, of a hammer for striking the sheet adjacent the scored line to fracture it along the scored line and means for causing the hammer to strike after the scoring is completed.

In testimony whereof I affix my signature in presence of two witnesses.

IRVING W. COLBURN.

Witnesses:
JAMES WHITTEMORE,
S. E. EICHMAN.